United States Patent [19]

Brueckmann et al.

[11] Patent Number: 4,943,602

[45] Date of Patent: Jul. 24, 1990

[54] PREPARATION OF AQUEOUS POLYESTER DISPERSIONS AND USE THEREOF

[75] Inventors: Ralf Brueckmann, Goennheim; Heinz Leitner, Ladenburg; Holger Schoepke, Ludwigshafen, all of Fed. Rep. of Germany

[73] Assignee: BASF Aktiengesellschaft, Ludwigshafen, Fed. Rep. of Germany

[21] Appl. No.: 320,963

[22] Filed: Mar. 9, 1989

[30] Foreign Application Priority Data

Mar. 17, 1988 [DE] Fed. Rep. of Germany ....... 3808882

[51] Int. Cl.$^5$ .............................................. C08J 3/00
[52] U.S. Cl. ................................... 524/600; 524/602; 524/604; 524/608; 528/288; 528/296; 528/302; 528/308.4; 528/308.6; 525/437
[58] Field of Search ............... 528/272, 288, 296, 302, 528/308.4, 308.6; 525/437; 524/600, 602, 604, 608

[56] References Cited

U.S. PATENT DOCUMENTS

| | | |
|---|---|---|
| 3,546,008 | 12/1970 | Shields et al. .................. 428/395 |
| 3,548,026 | 12/1970 | Weisfeld et al. .................... 525/533 |
| 4,122,055 | 10/1978 | Tugukuni et al. .................. 523/409 |
| 4,172,822 | 10/1979 | Patzschke .......................... 524/539 |
| 4,268,645 | 5/1981 | Lark .................................... 525/437 |

*Primary Examiner*—John Kight, III
*Assistant Examiner*—Sam Acquah
*Attorney, Agent, or Firm*—Oblon, Spivak, McClelland, Maier & Neustadt

[57] ABSTRACT

Aqueous polyester dispersions are prepared by
(a) condensing an aromatic dicarboxylic acid or ester with at least one diol to give a prepolymer having an acid number of from 2 to 8,
(b) reacting the prepolymer with at least one molecular weight enhancer compound, e.g. trimellitic anhydride to give a polyester having an acid number of from 40 to 60, and
(c) dispersing the polyester in an aqueous medium to form an aqueous dispersion by adding an aqueous mixture of ammonia and an amine in a molar ratio of from 10:1 to 1:10 to a melt of the polyester which has a temperature within the range from 150° to 230° C., and are used as sizes for sizing filament warp yarns.

3 Claims, No Drawings

PREPARATION OF AQUEOUS POLYESTER DISPERSIONS AND USE THEREOF

In the textile industry it is known to treat textile multifilament warp yarns with a size which bonds the individual filaments of the yarn together. The treatment with a size reinforces and consolidates the yarns and makes them more resistant to abrasion during weaving. Filament yarns, in particular those fine-denier ones consisting of individual filaments within the range from 4 to less than 1 dtex, require very special mechanical protection for use in weaving on high-performance weaving machines. This protection is obtained by sizing the warp yarns with specific synthetic polymers. Smooth filament yarn in particular can these days only be successfully sized with sizes of very high adhesivity and abrasion resistance.

Most sizes which even a few years ago were up to the requirements of the art must these days be considered outdated and not sufficiently abrasion-resistant for this area, where high productivity is required.

A good filament size must these days meet the following requirements:

1stly in sizing utilizability on single yarn sizing machines at speeds of up to 500 m/min, which requires low-viscosity, low-foam, shear-resistant sizing liquors;

simple liquor preparation with low viscosity independent of shear gradient;

good wetting of filaments with easy and rapid penetration;

good compatibility with the spin finish oils on the yarns;

no fusing together of the warp yarns under the influence of moisture and/or spin finish oils or re-oil products;

2ndly in weaving:

utilizability on all weaving machines including waterjet weaving machines;

abrasion-resistant size film stable under atmospheric conditions, including high humidity;

high yarn cohesion and interfilament adhesion;

high weaving efficiencies at low addon; and

3rdly in gray cloth conversion:

easy washoff;

compatibility even in hard water;

alkali insensitivity;

good fabric outcome, i.e. unaffected fabric hand and high fabric absorbance after desizing; and no effluent problems and high eliminability and mineralizability.

Whether these requirements are met can be checked using objective test methods.

According to these objective test methods, there is no filament size, in particular no size for smooth filament, which meets all the requirements. It is frequently necessary to compromise; improvements in one respect cause drawbacks in another.

For instance, sizes which are extremely insensitive to atmospheric conditions are frequently very difficult to wash off owing to their good water resistance. Since they consist of hydrophobic units, they usually are more sensitive to the oil components in the yarn finish; the yarns sized therewith are more prone to electrostatic charge buildup. The sizing liquors are more likely to form a skin.

Sizes which are insensitive to spin finish oil and re-oil products contain more hydrophilic or polar groups. In general, they are easier to wash off and have better antielectrostatic properties. This advantage has to be paid for with the disadvantage of higher atmospheric sensitivity. Frequently, moreover, these sizes are not suitable for waterjet weaving machines.

Any softening of size films due to temperature, moisture and/or spin finish oil and re-oil product can be compensated by formulating for higher film hardness in the synthesis of size compositions. The hardness and the (lack of) adhesion of a size film, however, are largely unentwineable from one another; that is, even with an otherwise similar structure of the size, the harder film shows lower adhesion than the softer film. As a consequence, the size softens to a greater or lesser extent depending on the action of moisture (atmosphere), spin finish oil, re-oil product, any further additives in the sizing liquor, and temperature. The adhesive power of the size varies with the atmospheric conditions in the weaving shed and with the influence of the numerous different (formulated according to yarn type) spin finishes.

Practical experience has shown that for the above-mentioned reasons it is difficult to make do with a single filament size for the whole range of filament yarns or even for one class of yarns (e.g. polyester only).

For this reason most size manufacturers offer more than one size for the sizing of filament. The size products are adapted to the specific yarn type with its spin finish addon, to the atmospheric and weaving shed conditions of the countries where the yarns are to be woven, and to the particular type of weaving machine.

Particularly suitable sizes for polyester filament are acrylate or methacrylate copolymers and polyester condensation products. Each class of product has its particular advantages:

Acrylate and methacrylate copolymers are less alkali-, salt- or polyelectrolyte-sensitive than polyester resins. They are therefore particularly simple to wash off. Moreover, fewer incompatibility reactions are likely at the liquor preparation stage in the sizing room. Acrylate and methacrylate copolymers which are suitable for sizing warp yarns on waterjet looms are less moisturesensitive than prior art polyester resins. Polyester resins, on the other hand, are more abrasion-resistant unless exposed to extremely high moisture levels, and usually give better yarn cohesion. This is found particularly clearly on smooth polyester filament yarn.

To obtain the same weaving efficiency with a polyester filament yarn (for example a smooth 24-filament 70-dtex PES yarn) it is necessary for example to use 3.5% by weight of a polyester size or 5.5% by weight of a poly(meth)acrylate size. So even the comparison of two good prior art products indicates in this case an active ingredient ratio of 1:1.6.

The spin finish oil sensitivity of polyester resins synthesized from aromatic dicarboxylic acids or the sodium sulfonate derivatives thereof is less marked than with acrylate copolymers. Polyester sizes based on condensation products of isophthalic acid or esters and/or terephthalic acid or esters, diols (including in some instances polyols) and sulfonato-containing dicarboxylic acids or diols/polyols are used in fabric production from smooth filament yarns on shuttleless high-performance weaving machines.

Polyester fibers are known for example from U.S. Pat. Nos. 3,546,008 and 3,548,026. The preparation of polyesters having free carboxyl groups by a two-stage method is described in U.S. Pat. No. 4,268,645. In the first stage, aromatic dicarboxylic acids or esters are condensed with at least one diol to give a prepolymer having an acid number of less than 4, and in the second stage the prepolymer thus obtained is reacted with at least one molecular weight enhancer compound, e.g. trimellitic anhydride, to give polyesters having acid numbers of 15 to 55. The polyester is dissolved in secondary butanol and neutralized with a combination of ammonium hydroxide and sodium hydroxide solution. Further dilution with water gives a 30% strength dispersion which, according to claim 9 of said U.S. Pat. No. 4,268,645, is suitable for sizing polyester and polyester/cotton warp yarn, i.e. staple fiber warp yarn. Dispersions which contain sec-butanol are not easy to use. Furthermore, polyester sizes neutralized with ammonia and sodium hydroxide are very sensitive to atmospheric moisture and, if used on warp yarn without further additives, tend to cause yarns to stick together.

The products mentioned are not suitable for sizing filament warp yarn because, used in the pure form, they are excessively sensitive to atmospheric humidity. The size films are excessively soft at 65% relative humidity, while at 80% relative humidity they even become tacky. The spin finish on the filament yarn and customary liquor additives and re-oil products cause further softening and would strongly impair the abrasion resistance if used to size filament yarn.

The operation of combining the individual beams into warp beams subjects the yarns to increased takeoff forces which are accompanied by defibrillations (breaking open of the filament assembly). On prolonged storage the warp beams become blocking since the warp threads become stuck to one another, so that further processing is impossible. For this reason the polyester dispersion described above in more detail is not suitable as a size for use on waterjet weaving machines.

It is an object of the present invention to provide a polyester dispersion which is suitable for use as a size in particular for filament and is processible on any weaving machine. The size should show high adhesion and produce humidity-stable, water-resistant, abrasion-resistant and nonblocking films on the sized yarns.

We have found that this object is achieved according to the invention by a process for preparing aqueous polyester dispersions by (a) condensing an aromatic dicarboxylic acid or ester with at least one diol to give a prepolymer having an acid number of from 2 to 8, (b) reacting the prepolymer with at least one molecular weight enhancer compound from the group of the tricarboxylic acids, esters of tricarboxylic acids and carboxylic anhydrides having at least one free carboxyl group to give a polyester having an acid number of from 40 to 60, and (c) dispersing the polyester in an aqueous medium to form an aqueous dispersion,
which comprises dispersing the polyester by adding an aqueous mixture of ammonia and an amine in a molar ratio of from 10:1 to 1:10 to a melt of the polyester which has a temperature within the range from 150° to 230° C. The partially or completely neutralized polyester dispersions thus obtainable are sizes for filament warp yarns, in particular for polyester filament warp yarns.

The polyester is prepared by a two-stage polycondensation process known for example from U.S. Pat. No. 4,268,645 (incorporated by reference). In step (a), first of all a prepolymer having an acid number of from 2 to 8 is prepared by condensing an aromatic dicarboxylic acid or ester with at least one diol at from 180° to 240° C., preferably at from 230° to 235° C. Examples of suitable aromatic carboxylic acids are terephthalic acid, isophthalic acid and tert-butyl isophthalic acid. In place of dicarboxylic acids it is also possible to use the methyl and ethyl esters of the carboxylic acids, for example dimethyl terephthalate. Modification of the prepolymers is also possible by using sulfonated aromatic dicarboxylic acids or esters in the condensation mixed with the aromatic dicarboxylic acids or esters.

The amount of sulfonated aromatic dicarboxylic acids or esters is from 0.5 to 4 mol % of all the aromatic carboxylic acids used in the condensation.

Suitable diols are for example $\alpha,\omega$-alkylene glycols of from 2 to 12 carbon atoms, e.g. ethylene glycol, 1,3-propylene glycol, 1,2-propylene glycol, neopentylglycol and 1,4-bis(hydroxymethyl)cyclohexane, and polyalkylene glycols, such as diethylene glycol, triethylene glycol and tetraethylene glycol. Preference is given to using diethylene glycol and mixtures of diethylene glycol and 1,4-bis(hydroxymethyl)cyclohexane in a molar ratio of from 0.6:0.4 to 0.8:0.2.

The aromatic dicarboxylic acids and the diols are condensed at from 180° to 240° C., preferably at from 230° to 235° C., in an inert gas atmosphere, for example nitrogen. If the esters are used, for example dimethyl terephthalate, a reaction temperature of from 180° to 200° C. is sufficient. Usually, a small molar excess of diol is used in stage (a) of the prepolymer preparation. The molar ratio of the diol : dicarboxylic acid or ester is from 1.1:1 to 1.2:1 and preferably 1.16:1. The water formed in the course of the condensation is distilled out of the reaction mixture. However, care must be taken to ensure that the diols are not removed together with the water formed in the course of the reaction. For this reason the water is advantageously distilled off through a column of high separating efficiency, so that constituents having a boiling point higher than water are held back. The top of column temperature is preferably maintained within the range from 70° to 95° C. Temperatures greater than 100° C. should be avoided at the top of the column. The polycondensation is carried out by means of customary esterification or transesterification catalysts, for example alkali metal hydroxides, alkali metal alcoholates, organic titanium compounds, salts of organic carboxylic acids, but in particular organic tin compounds, such as dibutyltin oxide, butylstannic acid, tetrabutyltin and butylchlorotin dihydroxide, and organic titanium compounds, in particular titanium alcoholates, such as titanium isopropoxide. It is also possible to use alkaline earth metal oxides and alkaline earth metal alcoholates as catalysts for the condensation reaction. Moreover, it is possible to use manganese acetate or manganese formate for this purpose. The amount of catalyst is from 0.05 to 1% by weight, based on the total amount of components.

The condensation in reaction stage (a) is carried on until a prepolymer having an acid number of from 1.5 to 8, preferably of from 1.5 to 4, is obtained. The acid number is determined potentiometrically, and the numerical value indicates the number of mg of KOH/g of condensate.

As soon as the condensation of an aromatic dicarboxylic acid or ester with at least one diol gives a prepolymer whose acid number is from 2 to 8, the temperature of the condensation product thus obtained is reduced to about 160°–180° C. During the condensation and preferably also during the cooling down of the prepolymer, measures are taken to ensure thorough mixing of the reaction components and/or product.

Stage (b) then comprises the reaction of the prepolymer with at least one molecular weight enhancer compound from the group of the tricarboxylic acids, tricarboxylic esters and carboxylic anhydrides having at least one free carboxyl group. The polyesters thus obtainable have carboxyl end groups. The preferred way of introducing these carboxyl groups in stage (b) of the condensation is to use trimellitic anhydride. The amount of compound used in (b) for preparing the polyester with acid end groups is from 10 to 20 mol %, based on the total amount of diol.

The condensation reaction in stage (b) is carried out at from about 180° to 230° C., preferably at from 195° to 205° C. Again the reaction mixture is stirred. The condensation has ended when the resulting reaction product has an acid number of from 40 to 60, preferably of from 45 to 55.

The average molecular weight of the polyester which has been modified with acid groups is preferably from 150,000 to 350,000, in particular within the range from 165,000 to 200,000 (average molecular weight determined by light scattering in dimethylformamide as solvent).

According to the invention, the polyesters obtainable as per (b) are dispersed in step (c) to obtain aqueous polyester dispersions by adding aqueous mixtures of ammonia and amines in a molar ratio of from 10:1 to 1:10 to the still hot melt at from 150° to 210° C. Again the dispersing stage (c) is effected by mixing the reactants. No dispersant is required. Water is added in such an amount as to give from 10 to 40% strength by weight polyester dispersions. The amounts of ammonia and amine are chosen so as to give partial or complete neutralization of the polyester obtained as per (b). Partial neutralization means for example neutralization of at least 70% of the carboxyl groups in the polyester. An excess of ammonia/amine, although possible, does not produce any further benefits in the practical use of the resulting aqueous polyester dispersions as sizes.

The aqueous mixture of ammonia and amines is added to the polyester melt at from 150° to 210° C., preferably at from 150° to 200° C. However, the temperature should not be below 150° C. because otherwise there is a risk of not obtaining a finely divided dispersion of the polyester in water. The aqueous polyester dispersion can also be prepared from the melt by first slowly adding up to about half of the requisite amount of water, then adding the mixture of ammonia and amine and only at the end adding the remaining amount of water. In the course of the addition of water or of the aqueous mixture of ammonia and amine to the melt, the temperature of the melt decreases. The water added to the melt at from 150° to 200° C. may have been heated to a temperature close to its boiling point. Customarily, the water added to the melt has a temperature of from 10° to 95° C. The aqueous mixture of ammonia and amines added to the hot melt may have a temperature within the range from 10° to 40° C. Customarily, the temperature of the components added to the melt is from 10° to 25° C. After the addition of the ammonia/amine/water mixture has ended, the temperature of the mixture is from 70° to 100° C. The polyester dispersion thus obtained is stirred at from 95° to 35° C. for a further 2–12, preferably 4–6, hours and then cooled down to ambient temperature.

Ammonia is customarily used in the form of the concentrated aqueous solution. Although any amine may be used, some amines are preferred on account of their troublefree handleability. These amines include for example diethylethanolamine, triethanolamine, methyldiethanolamine, dimethylethanolamine, dibutylethanolamine, butyldiethanolamine, diisopropanolamine and triisopropanolamine. Of the amines mentioned, triethanolamine is preferred.

The molar ratio of ammonia:amine is from 10:1 to 1:10, preferably from 1:1 to 6.5:3.5. Particular preference is given to aqueous mixtures of ammonia and triethanolamine in a molar ratio of from 3:1 to 1:2.

Aqueous polyester dispersions having a solids content of from 10 to 40% by weight and a dispersed polyester particle size of $\leq 1$ $\mu$m are obtained in stage (c). The dispersion should be filterable through a cotton cambric filter almost without leaving any residue. The polyester dispersions thus obtainable are used as sizes for sizing filament warp yarns, in particular for sizing polyester filament warp yarns. The weaving of filament yarn, consisting of large numbers of continuous individual filaments, into textile material is only possible if the warp yarn is treated prior to weaving with a size whose function is to cement the individual filaments together under the high mechanical stresses of weaving and hence to prevent broken ends and knotting due to filament breakages or yarn abrasion.

A measure of the quality of the size in relation to the protection and stabilization of the yarn it confers is the degree of yarn cohesion, which can be determined by means of the Shirley filament counter. The filament yarn is cut through before and after sizing. From the number of pulses counted in the course of cutting it is possible to calculate the number of free, unbonded individual filaments. The value for the unsized yarn is set equal to 100, denoting that 100% of the individual filaments are unbonded. After sizing, a distinctly smaller proportion of unbonded filaments is found. For a good size this proportion should be between 10 and 25%, depending on yarn type.

In the literature, these numbers are reported as MANRA values. A MANRA value of 12 indicates for example that only 12% of the individual filaments originally determined with the Shirley filament counter are not bonded to one another at the cut. Up to a few years ago it was considered sufficient to quote these MANRA values when comparing the quality of various sizes. Since then the mechanical stresses of weaving have risen enormously owing to modern high-performance weaving machines. The quality of size products has increased to such an extent that simple MANRA values no longer allow any distinction at all. These days, therefore, before measurement the sized yarns are mechanically stressed with the Reutlingen Webtester testing apparatus, which simulates the weaving process. The combination of Webtester with Shirley filament counter gives test results which permit realistic predictions about the weaving properties of the sized warp yarn.

The lower the MANRA values are in the test methods mentioned, ideally for low size addons, the better the yarn cohesion and the interfilament adhesion and hence the obtainable weaving efficiency.

In what follows, the designation M0 indicates that this MANRA value was measured before the filament yarn was subjected to the Webtester. M 200 indicates that prior to the filament counter measurement the yarn was exposed to 200 stress cycles on the Webtester.

In these circumstances, a utilizable size shows a MANRA value of at least 50. The smaller the difference between M0 and M 200, the better the adhesion and the yarn cohesion due to the size.

However, a good size must not only bring about good yarn cohesion and mechanical stabilization of the warp yarn but also have numerous other specific properties for its use not to give rise to production problems.

The size must not leave any sticky residue on metallic yarn guide elements, and the sized yarn should have a very low coefficient of friction on metal and should not stick to other sized yarns or to machine parts. The size must be sufficiently soluble or dispersible in water, and the ready-to-use aqueous solutions or dispersions must not form a skin, since skins lead to persistent soiling and stickiness on the yarns and hence ultimately to production problems. It is particularly important that, after weaving, the size is completely removable from the textile material by washing. This requirement is a prerequisite for smooth further processing, for example by dyeing.

To test whether the mechanical properties of a size are adversely affected by atmospheric conditions and whether the size tends to leave a residue, there are a number of quick preliminary tests: 1. qualitive assessment of size films following water storage at various temperatures or in conditioning chambers at 65 and 80% relative humidity and 2. numerical rating of the mechanical level by determination of the pendulum hardness after 24 hours' storage of the films at 65 and 80% relative humidity.

As a guide, in conformity with practical results, the pendulum hardness at 65% relative humidity should not be below 20 and at 80% relative humidity not below 10. Otherwise the size is not waterjet suitable, the yarn sheets on the warp beams become blocking with increasing storage, and abrasion and mechanical problems occur on weaving.

Waterjet suitable sizes should be completely washed off under the conditions of 80° C./2 g/l of sodium carbonate/1 g/l of good wetting agent with good agitation in a short-time process. By using 2 g/l of sodium carbonate the test of the washoff properties of the size can also be carried out with wash water of somewhat higher natural hardness.

The polyester dispersions which according to the present invention are used as sizes meet the abovementioned requirements.

(Literature: Melliand Textilberichte 67 (1987), 270, M. S. Kellon, C. Pividori, M. Alphonsus, Entschlichten der wichtigsten Schlichtefamilien auf Polyesterfilamentgarnen, speziell der wasserdispergierbaren Polyesterschlichten.)

EXAMPLE 1

A dry 1-liter four-necked flask equipped with a stirrer, a thermometer, a gas inlet tube and a Vigreux column with a reflux condenser head is charged under nitrogen with 68.9 g (0.65 mol) of diethylene glycol and 50.5 g (0.35 mol) of cyclohexanedimethanol (=1,4-bis(-hydroxymethyl)cyclohexane), and the contents are heated to 80° C. At this temperature 121.2 g (0.73 mol) of isophthalic acid and 21.6 g (0.13 mol) of terephthalic acid are added, and the temperature is raised to 135° C. 0.1% (0.3 g) of butylstannic acid is added as a catalyst. The temperature is then gradually raised to 230° C. The reaction temperature is kept at 230°-235° C. until the resulting polyester has an acid number of from 1.5-3 mg of KOH/g. Once the aforementioned acid number is reached, the reaction mixture is cooled down to 200° C., and 20.8 g (0.15 mol) of trimellitic anhydride are added. The reaction mixture is then stirred at 200°-205° C. until it has an acid number of 50 mg of KOH/g. The hot melt is then very slowly admixed with a mixture of 600 g of water, 10.4 g (0.11 mol) of triethanolamine and 9.1 g (0.134 mol) of ammonia (25% strength) by stirring. The temperature falls and is maintained at 90° C. Stirring is continued at 90° C. for 4 hours, and the approximately 30% strength polyester dispersion is then cooled down to room temperature. The average size of the dispersed particles in the dispersion was <1 μm. The neutralization of the dispersed polyester was 100%.

EXAMPLE 2

Example 1 was repeated, except that the terephthalic acid was replaced by dimethyl terephthalate and the condensation temperature was reduced from 230°-235° C. to 200°-205° C., affording a 100% neutralized polyester dispersion having very similar properties to those under Example 1, the average particle size of the dispersed particles being <1 μm.

EXAMPLE 3

Example 1 was repeated, except that the polyester dispersion was prepared by first stirring in half the water at 200° C., then the ammonia/amine mixture at 100° C. and finally the remaining water. The average particle size of the dispersed polyester was <1 μm, the neutralization being 100%.

EXAMPLE 4

Table 1 presents the properties of warp yarns sized with polyester dispersions prepared by treating the condensation product described in Example 1 with the ammonia/amine mixtures mentioned in Table 1, in each case at 200° C. Neutralization was 100%.

TABLE 1

|  | Ammonia/amine[a] | Pendulum hardness[b] 65 80% relative humidity | MANRA value[c] M0 | M200 |
|---|---|---|---|---|
| Polyester dispersion A | Ammonia/triethanolamine | 41    20 | 13 | 18 |
| B | Ammonia/tetramethylethylenediamine | 42    21 | 13 | 44 |
| C | Ammonia/methyldiethanolamine | 26    17 | 14 | 24 |
| D | Ammonia/butyldiethanolamine | 20    12 | 15 | 32 |
| E | Ammonia/diethylethanolamine | 28    19 | 21 | 35 |

[a] molar ratio ammonia/amine 1:1
[b] Konig method
[c] MANRA values at 6% addon on smooth 18-filament 50-dtex polyester calculated by linear regression from at least three different addons between 3 and 8% by weight.

TABLE 2

| Polyester dispersion | Molar ratio $NH_3$/ $N(CH_2CH_2OH)_3$ | Pendulum hardness at 65% 80% relative humidity | MANRA values[c] M0 | M200 |
|---|---|---|---|---|
| Preparation according to | 1:1 | 24    10 | 10 | 18 |
|  | 5.5:4.5 | 41    20 | 13 | 18 |

TABLE 2-continued

| Polyester dispersion | Molar ratio NH$_3$/ N(CH$_2$CH$_2$OH)$_3$ | Pendulum hardness at 65% 80% relative humidity | | MANRA values[c] M0 M200 | |
|---|---|---|---|---|---|
| Example 1, except differently | 6:4 | 41 | 20 | 15 | 30 |
| | 6.5:3.5 | 52 | 27 | 15 | 32 | neutralized, the temperature of the melt at the start of addition being in each case 200° C., the neutralization of the dispersed polyester being 100%.

Table 2 reveals the direct influence of the ammonia/amine mixing ratio on pendulum hardness and MANRA values.

The tables clearly show that the polyester dispersion can be standardized to specific, desirable application properties in a controlled manner by appropriate variation of the ammonia/amine mixing ratio.

EXAMPLE 5

Example 1 was repeated, except that the isophthalic acid was replaced by 3 mol % of sulfoisophthalic acid. The solubilizing principle of the polyester dispersions obtained is now due to a mixture of sulfo and carboxyl groups in the polyester. The polyester dispersions thus obtained likewise have good properties and are waterjet suitable.

The strong correlation between the number of units for the polyester condensation polymer, the degree of condensation and the method of condensation, the method of preparing the dispersion and the choice of neutralizing component does not become fully apparent until the size is application tested on polyester filament yarn, in particular smooth yarn, under practical conditions.

It is true that U.S. Pat. No. 4,268,645 describes the preparation of polyester sizes from the same building blocks, but in none of the examples mentioned therein is a practically utilizable polyester size for filament yarn obtained. Nor does the size have the desired atmospheric stability.

REFERENCE EXAMPLE 1

Example 1 of U.S. Pat. No. 4,268,645 is repeated to prepare a polyester from isophthalic acid, diethylene glycol (6+7 mol) and 1.05 mol of trimellitic anhydride with an acid number of 42-45 and said polyester is converted with sec-butanol, NH$_4$OH/NaOH and water into a dispersion having a solids content of 29%. The neutralization was 100%.

REFERENCE EXAMPLE 2

U.S. Pat. No. 3,546,008 is followed to condense isophthalic acid, terephthalic acid and diethylene glycol in a molar ratio of 1.02:0.18:1.40 and 0.21 mol of trimellitic anhydride to prepare a polyester having an acid number 43.5. The product was ground and made into a dispersion of triethylamine and water (solids content of the dispersion: 32.5%; neutralization: 100%).

REFERENCE EXAMPLE 3

Isophthalic acid, terephthalic acid, diethylene glycol and 1,4-cyclohexanedimethanol are condensed in a molar ratio of 1.02:0.18:0.91 : 0.49 with 0.21 mol of trimellitic anhydride to give a polyester having an acid number 45.9. The product was ground and made with triethylamine and water into a 30% strength dispersion (neutralization 100%).

TABLE 3

| Polyester dispersion according to Reference Example | Pendulum hardness at 65/80% relative humidity | Film assessment after water storage at 22° C. |
|---|---|---|
| 1 | 11/3 | sticky, greasy |
| 2 | 2/2 | turns white, extremely extensible |
| 3 | 13/4 | turns white, sticky, after 60 min severe impairment of mechanical strength |

All three size films additionally show low thermal stability in the form of a melt adhesive effect with the films beginning to flow even at below 80° C. This would inevitably cause problems on passage over the drying cylinders of the sizing machine.

A hardness test, namely water storage of the films at 50° C., additionally illustrates the water insensitivity of the products according to the invention compared with the prior art products (cf. Table 4).

TABLE 4

Water storage at 50° C. of warp yarns sized with a polyester dispersion obtained according to

| Size | Reference Example 1 | 2 | 3 | Example 1 |
|---|---|---|---|---|
| pH after 10 min | 7.3 | 7.2 | 5.1 | 6.0 |
| Film after 5 min | swollen | strongly swollen | clear solution | extensible intact film |
| Film after 10 min | disintegrated into gel particles | disintegrated into gel particles | clear solution | extensible intact film, viscous |

Only the product obtained according to Reference Example 1 is considered suitable, at least under atmospheric conditions in northern Europe, for use on waterjet weaving machines. The products of Reference Examples 2 and 3 are too water- or humidity-sensitive. The size of Example 1 is superior to all other products.

We claim:

1. A process for preparing an aqueous polyester dispersion, which comprises
    (a) condensing an aromatic dicarboxylic acid or ester with at least one diol to give a prepolymer having an acid number of from 2 to 8,
    (b) reacting the prepolymer with at least one molecular weight enhancer compound selected from the group consisting of tricarboxylic acids, esters of tricarboxylic acids and carboxylic anhydrides having at least one free carboxyl group to give a polyester having an acid number of from 40 to 60, and
    (c) dispersing the polyester in an aqueous medium to form an aqueous dispersion by adding an aqueous mixture of ammonia and an amine in a molar ratio of from 10:1 to 1:10 to a melt of the polyester which has a temperature within the range from 150° to 230° C.

2. A process as claimed in claim 1, wherein the melt of the polyester is admixed first with water and then with an aqueous solution of a mixture of ammonia and an amine.

3. A process as claimed in claim 1, wherein an aqueous mixture of ammonia and triethanolamine in a molar ratio of 3:1 to 1:2 is used.

* * * * *